(12) United States Patent
Sladek et al.

(10) Patent No.: US 7,054,654 B1
(45) Date of Patent: *May 30, 2006

(54) AUTOMATIC MESSAGING IN RESPONSE TO TELEVISION VIEWING

(75) Inventors: Thomas M. Sladek, Overland Park, KS (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 101 days.

This patent is subject to a terminal disclaimer.

(21) Appl. No.: 10/785,267

(22) Filed: Feb. 24, 2004

Related U.S. Application Data

(63) Continuation-in-part of application No. 09/459,206, filed on Dec. 10, 1999, now Pat. No. 6,718,178, which is a continuation-in-part of application No. 09/410,869, filed on Oct. 1, 1999, now Pat. No. 6,560,327, and a continuation-in-part of application No. 09/411,885, filed on Oct. 4, 1999, now Pat. No. 6,522,876, and a continuation-in-part of application No. 09/411,878, filed on Oct. 4, 1999, now Pat. No. 6,622,016.

(51) Int. Cl.
*H04Q 7/20* (2006.01)
(52) U.S. Cl. .................. 455/466; 380/210; 725/53; 725/35; 370/260; 370/352; 370/432
(58) Field of Classification Search ............. 380/210; 725/53, 35; 370/260, 352, 432
See application file for complete search history.

(56) References Cited

U.S. PATENT DOCUMENTS

| 5,577,102 A | 11/1996 | Koivunen |
| 5,590,186 A | 12/1996 | Liao et al. |
| 5,742,668 A | 4/1998 | Pepe et al. |
| 5,765,108 A | 6/1998 | Martin et al. |
| 5,768,276 A * | 6/1998 | Diachina et al. ............ 370/432 |
| 5,806,000 A | 9/1998 | Vo et al. |
| 5,839,076 A | 11/1998 | Becher |
| 5,878,397 A | 3/1999 | Stille et al. |
| 5,915,222 A | 6/1999 | Olsson et al. |
| 5,933,778 A | 8/1999 | Buhrmann et al. |
| 5,946,629 A | 8/1999 | Sawyer et al. |
| 5,946,630 A | 8/1999 | Willars et al. |
| 5,978,685 A | 11/1999 | Laiho |
| 6,005,845 A * | 12/1999 | Svennesson et al. ........ 370/260 |
| 6,035,104 A | 3/2000 | Zahariev |
| 6,049,713 A | 4/2000 | Tran et al. |
| 6,112,084 A | 8/2000 | Sicher et al. |
| 6,119,167 A | 9/2000 | Boyle et al. |
| 6,128,481 A | 10/2000 | Houde et al. |
| 6,134,432 A | 10/2000 | Holmes et al. |
| 6,138,006 A | 10/2000 | Foti |
| 6,138,146 A | 10/2000 | Moon et al. |
| 6,167,248 A | 12/2000 | Hamalainen et al. |
| 6,212,377 B1 | 4/2001 | Dufour et al. |
| 6,219,694 B1 | 4/2001 | Lazaridis et al. |
| 6,223,046 B1 | 4/2001 | Hamill-Keays et al. |
| 6,249,808 B1 | 6/2001 | Seshadri |
| 6,253,061 B1 | 6/2001 | Helferich |
| 6,289,223 B1 | 9/2001 | Mukherjee et al. |

(Continued)

*Primary Examiner*—William Trost
*Assistant Examiner*—Michael Vu

(57) ABSTRACT

An automatic messaging system, in which, when a person tunes to a particular television station, a video server sends an SMS message indicating the station being watched. The video server could be a host device, such as a cable-TV receiver or satellite receiver that serves the television, or could take other forms.

5 Claims, 11 Drawing Sheets

U.S. PATENT DOCUMENTS

| | | |
|---|---|---|
| 6,308,075 B1 | 10/2001 | Irten et al. |
| 6,349,140 B1 * | 2/2002 | Ushiyama .................. 380/210 |
| 6,360,272 B1 | 3/2002 | Lincke et al. |
| 2004/0117831 A1 * | 6/2004 | Ellis et al. .................... 725/53 |
| 2005/0169255 A1 * | 8/2005 | Shimomura et al. ........ 370/352 |
| 2005/0204382 A1 * | 9/2005 | Ellis ............................ 725/35 |

* cited by examiner

AUTOMATIC MESSAGING IN RESPONSE TO TELEVISION VIEWING

RELATED APPLICATIONS

This is a continuation-in-part of U.S. patent application Ser. No. 09/459,206, filed Dec. 10, 1999, now U.S. Pat. No. 6,718,178, which is a continuation-in-part of (i) U.S. patent application Ser. No. 09/410,869, filed Oct. 1, 1999, now issued as U.S. Pat. No. 6,560,327, (ii) U.S. patent application Ser. No. 09/411,885, filed Oct. 4, 1999, now issued as U.S. Pat. No. 6,522,876, and (iii) U.S. patent application Ser. No. 09/411,878, filed Oct. 4, 1999, now issued as U.S. Pat. No. 6,622,016. The entirety of each of these applications and patents is hereby incorporated by reference.

BACKGROUND OF THE INVENTION

1. Field of the Invention

The present invention relates to telecommunications services and more particularly to a method and system for sending messages in response to network activity.

2. Description of Related Art

Advances in telecommunications have enabled a number of special services to be made available to telecommunications subscribers. Examples of such services include abbreviated dialing, which allows a subscriber to reach a party by dialing less than the entire telephone number of that party, call forwarding, in which calls directed to the subscriber may be forwarded to another line, terminating call screening, which allows the subscriber to specify certain times during which incoming calls are to be rejected, and originating call screening, in which calls to certain telephone numbers are barred. In general, special telecommunications services ("services") encompass those service features that do more than simply place or terminate telephone calls as dialed.

In the past, special telecommunications services were governed and provided for exclusively by the network switches or other entities that routed calls from one location to another. Such switches or other entities are usually at least part of a "serving system" that provides service for a plurality of subscribers. A typical switch would include a database of control information and call processing logic in addition to its basic switching capabilities. In response to a call placed to or from a subscriber, the switch would then apply services defined by this call processing logic. For example, the service logic may indicate that all unanswered calls to a particular subscriber should be redirected to a particular voice mail server.

This approach was viewed as unwieldy, however, because a telecommunications provider needed to update the software and databases on all of its many switches in order to update services or add new services throughout its telecommunications network. And to further complicate matters, the software needed to program switches from different vendors often differed greatly.

To overcome these limitations, many telecommunications networks have now adopted an intelligent network ("IN") approach. According to the IN approach, much of the control information and call processing logic resides in a central network location or "central control point" instead of in the multitude of switches. Each switch is then programmed with a relatively minimal set of service logic that causes the switch to query the central control point at predefined "trigger points" during call processing, providing the central control point with parameters such as an identification of the calling and called parties, for example. When the central control point receives the query message, it may execute an appropriate set of service logic and/or consult appropriate databases in order to obtain information and instructions needed to provide a special service to the call. In turn, the central control point may return a response message to the switch, instructing the switch how to handle the call.

By applying the IN approach, the call processing information that is maintained locally for reference by the switch can be minimized, since most of the service logic and feature information for the subscriber can be maintained by the central control point instead. In this way, the telecommunications switches can be quite generic but still able to carry out a variety of services. Further, changes made to service logic at the central control point can apply to a large number of switches, which makes changing or activating services and adding new services much easier and reduces the problem of differences in switches from different vendors.

An IN network typically employs a standardized set of messages for communication between the switches (or other such entities) and the central control point, in order to allow for a variety of services. This standardized set of messages may be conveyed, for instance, over an out-of-band common channel interoffice signaling (CCIS) network, according to an established signaling protocol. The most well known such protocol is Signaling System #7 ("SS7"). According to SS7, predefined messages may be coded as Transaction Capabilities Application Part ("TCAP") messages and routed via a signaling transfer points ("STPs") between the switches and the central control point.

The particular message set may vary depending on the type of network. For instance, traditional landline IN networks may operate according to standards embodied in Bellcore's AIN Release 0.1 and AIN Release 0.2. Typical wireless networks, on the other hand, may operate according to other standards, such as Telecommunications Industry Association (TIA)/Electronics Industry Association (EIA) Interim Standard IS-41 ("Cellular Radiotelecommunications Intersystem Operations") and Interim Standard IS-771 ("Wireless Intelligent Network"). The entirety of each of these standards (as well as all revisions thereof) is hereby incorporated herein by reference.

In general, the trigger points and other control information about call processing for a given subscriber or group of subscribers can be defined and recorded in a database that is maintained for reference by the serving system during call processing. This set of parameters is considered a type of profile for the subscriber, or a subscriber profile. When the switch receives a request to complete a call to or from a subscriber, the switch may consult the subscriber's profile to determine whether it needs to query a central control point for call-handling instructions and/or whether it should carry out certain call processing logic itself.

A subscriber profile may define various types of trigger points and control information. At a basic level, for instance, a profile may define a so-called "all-digits trigger," which tells the serving system to query the central control point whenever the serving system receives a call origination attempt from the subscriber. Similarly, a profile may define a termination-attempt trigger, which tells the serving system to query the central control point whenever the serving system receives a request to connect a call to the subscriber. Such global triggers can be usefully employed to give the central control point extensive control over the services that will be provided to the subscriber. For example, upon receipt of a TCAP query that is generated upon call origination, the central control point may determine that the calling subscriber has subscribed to a pre-paid call accounting service; in response, the central control point may initiate logic that will time the subscriber's call and decrement a pre-paid account balance accordingly.

The profile can define more specific triggers as well. For example, the profile may define a call origination trigger indicating that the serving system should further reference the subscriber profile to determine whether the subscriber is attempting to call a restricted destination, e.g., that the subscriber is blocked from calling a dialed number. Such a calling restriction may be desirable for group calling plans such as private branch exchange ("PBX") or Centrex service, or for parental control, for instance. If the number is blocked, standard local service logic may direct the serving system to respond with a recorded message or other appropriate action, or the trigger may indicate that the serving system should query the central control point for guidance.

As still another example, the profile may define a call termination trigger that indicates that if the called subscriber's line is busy or there is no answer, the call should be forwarded to a particular number that is recorded in subscriber's profile. Alternatively, the termination trigger may indicate that, in response to a busy or no answer condition, the switch should query the central control point for processing instructions. In that event, the central control point may apply a set of service logic for the subscriber and decide that the call should be forwarded to a specified number (e.g., to a specified voice mail system), or that the switch should operate as normal (e.g., provide a busy signal). The central control point may then instruct the switch accordingly.

The IN concept has been applied in various types of telecommunications networks. Examples of such networks include, for instance, landline networks and wireless networks (e.g., cellular radio transmission networks).

In a traditional landline arrangement, each serving system comprises a switch referred to as a service switching point ("SSP"). The SSP is coupled via an STP network to a central control point, which is referred to as a service control point ("SCP"). The SSP maintains a subscriber profile database (e.g., a table, or more generally a data template or plurality of data templates), which defines trigger points for a given subscriber or group of subscribers. The SCP, in turn, maintains a subscriber profile database as well, indicating what service logic to provide for a particular subscriber or group of subscribers. When the SSP encounters a trigger point during call processing, it generates a TCAP query message defining the subscriber and other parameters, and it sends the query to the SCP. The SCP, in turn references its subscriber profile database, and identifies and executes the appropriate set of service logic. The SCP then generates and sends to the SSP a TCAP response message providing call handling instructions (e.g., a routing instruction, an instruction to play a message to the caller, or an instruction to simply connect the call to the dialed address.) Of course other arrangements are possible as well.

In traditional wireless networks, each serving system comprises a switch often referred to as a mobile switching center ("MSC"), as well as a subscriber profile database referred to as a visitor location register ("VLR"). A wireless subscriber station or mobile station ("MS") may take the form of a cellular telephone, computer, pager, or personal data assistant ("PDA"), or other entity. The MS communicates over an air interface with a base station in a cell, and the base station is interconnected to the MSC, in order to provide connectivity with other points. Each mobile subscriber is registered in a home system. The home system includes a home location register ("HLR") that defines the services and features authorized for use by the subscriber. When a mobile station roams into a given serving system (even its home system), the serving system engages in signaling communication with the HLR in the MS's home system (i) to notify the HLR where the MS is located and (ii) to obtain the MS's current profile. The serving system then stores the profile in its VLR for reference.

In wireless, the IN concept is also referred to as Wireless Intelligent Network ("WIN"). Generally speaking, as in traditional landline systems, a wireless network may include a central control point to assist one or more serving systems in handling calls. However, a WIN arrangement typically employs a unique message set and provides additional capabilities in order to facilitate mobility management and other functions that are uniquely associated with providing service for mobile subscribers.

In current practice, the central control point in a WIN arrangement may be an SCP, HLR and/or other entity. When the serving system receives a call to or from a given MS, the serving system consults the MS's profile in the VLR and determines whether to query the central control point. A trigger point in the profile may instruct the serving system to send a signaling message to one or another central control point. The signaling message is typically defined by industry standards and encapsulated in a TCAP message, and the message provides the central control point with appropriate parameters such as an identification of the MS. Upon receipt of the signaling message, the central control point may identify and execute a set of service logic for the MS and then generate and send to the serving system a response signaling message providing call handling instructions.

As an example, a serving system in a wireless network may include in the profile for a given MS an all-digits trigger that causes the serving system to query a designated SCP in response to any digit sequence dialed at the MS. If a subscriber then dials an abbreviated dialing extension, the serving system would query the designated SCP for call handling instructions, the SCP may then translate the extension into a full routing number and return the full routing number to the serving system, and the serving system would route the call accordingly. As another example, the HLR for an MS may include in the profile for the MS a particular termination trigger that directs the serving system to query a designated SCP for call handling instructions in response to a termination attempt to the MS. When the serving system receives a termination to the MS, the serving system may then query the HLR for instructions, the HLR may send the termination trigger to the serving system as an "advanced termination trigger" (i.e., one that does not normally reside in the serving system), and the serving system may respond to the trigger by querying the designated SCP for call handling instructions.

In addition, it is possible to arrange for the central control point in one system to communicate with the central control point in another system. For instance, one carrier's network may include an SCP (SCP-1) that provides call processing logic for calls placed to or from the network. However, another carrier's network may include an SCP (SCP-2) that contains service logic for a user who happens to be using the first carrier's network at the moment. (For instance, the second carrier may sell telecommunications services to a customer of the first carrier). When SCP-1 receives a TCAP query from a serving system in the first's carrier's network, it may pass a signaling message to SCP-2 to find out what to do. SCP-2 may then identify and execute a set of service logic for the subscriber and then generate and return to SCP-1 a response signaling message providing call-handling instructions. SCP-1 would then send a response TCAP message to the serving system conveying the call-handling instructions, and the serving system would carry out the instructions. Such a mediated service logic system is disclosed, for instance, in the U.S. Pat. No. 6,560,327, which has been incorporated herein by reference.

In addition to providing enhanced services for processing traditional voice and data calls, advanced telecommunications systems have also given rise to other subscriber services. One such service offered in wireless communications systems is Short Message Service ("SMS"). SMS provides for the communication of short text messages to or from a mobile station or other entity without establishing a call connection. In general, the system may allow a person to simply type in a desired text message, indicate the directory number associated with a destination mobile station, and then transmit an SMS message encapsulating the desired text message. The telecommunications network then conveys the text message to the destination mobile station, where the message is typically displayed for receipt by an end-user.

A wireless network may provide a short message service center ("SMSC") (sometimes also referred to simply as a message center ("MC")), which is a functional entity that stores and forwards SMS messages. The store and forward function provides a method of sending short messages to their destination recipient or storing those messages if the recipient is unavailable to receive them. This store and forward function can generally be distinguished from the real-time delivery requirements of voice calls, although SMS messages may be delivered in real time.

According to industry standards, the message center can send messages to or from a functional entity known as a short message entity ("SME"). The SME is often an application entity that resides on a MS, and may sometimes be referred to as an MS-based SME. Alternatively, the SME can comprise, or reside on, another entity in a wireless or fixed network, i.e., in whether or not part of the wireless communications network. Typically, the SME can be arranged to compose, store, dispose of, act upon, display and/or otherwise manage short messages. It can also perform signaling functions to support other delivery features such as MS location and status queries, and mapping of destination addresses. In general, a typical SMSC can forward messages to an SME, store short messages for later delivery to an unavailable SMEs, apply originating and terminating SMS supplementary services (e.g., IN services) to short messages, and serve other functions.

Each MS-based SME is usually associated with an SMSC known as the "home SMSC" in the MS's home system. The MS-based SME is qualified like an MS is qualified, with an HLR sending SME service profile information (origination and termination restrictions) to an SMS-capable serving system along with MS related profile parameters, so that the serving system can know that the MS is qualified to receive and/or send short messages. Typically, a given SMSC then maintains the mobile identification number (MIN) address information of the MSs that it serves, and the SMSC is addressable by the directory numbers (e.g., telephone numbers, IP addresses, e-mail addresses, etc.) of those MSs for mobile terminated messages. When the SMSC receives a message for one of its MSs, it may then identify the location of the MS and forward the message via the serving system to the MS.

As further background, FIGS. 1 and 2 illustrate some of the signaling involved in traditional SMS processing, as described, for instance, in Michael D. Gallagher and Randall A. Snyder, "Mobile Telecommunications Networking With IS-41" (McGraw-Hill 1997). FIG. 1 first illustrates a scenario when one mobile station, MS-A (embodying SME-A), sends an SMS message to another mobile station, MS-B (embodying SME-B). As shown in FIG. 1, at step 1, MS-based SME-A first sends an air interface message, SMD-REQUEST (SMD-REQ), embodying a short message to its serving system. At step 2, the serving system routes the short message to SME-A's SMSC (message center, "MC"), using an IS-41 SMSDeliveryPointToPoint Invoke (SMDPP) message. Such an SMDPP message may be routed using the same SS7 signaling network as is used for routing other IS-41 messages (e.g., directing the message to a network point code associated with the SMSC), and/or using TCP/IP, X.25 or another desired protocol. The SMSC then returns an "smdpp" acknowledgement message, and SME-A's serving system returns an SMD-ACK to MS-A.

At step 3, SME-A's message center might apply an originating supplementary service to the short message and then send an SMDPP message to the destination SME's SMSC. At step 4, SME-B's message center may apply a terminating supplementary service to the short message and then send an SMDPP message to SME-B's serving system. At step 5, SME-B's serving system then forwards the short message to the destination SME using the air interface SMD-REQ message, and SME-B responds with an acknowledgement SMD-ACK to signal acceptance of the SMD-REQ message.

An MS-based SME can be addressed by its host's MIN (e.g., the MIN of the mobile station on which the SME resides). In order to then determine which SMSC to route a message to for a given destination SME, an entity can maintain a table of MIN-to-SMSC addresses (e.g., MIN to SS7 destination point code, or MIN to IP address, for instance), as is often done today in IS-41 networks for routing IS-41 messages to an MS's HLR. Thus, for example, in FIG. 1, MS-A's serving system can maintain a table that indicates the address of the SME-A's SMSC for use in step 2, and SME-A's SMSC can maintain a table indicating the address of SME-B's SMSC for use in step 3.

Generally speaking, in order to terminate an SMS message to an MS-based SME, the SMSC that seeks to send the message must get a valid routing address for the system currently serving the SME. To facilitate this, IS-41 provides a special SMS_Address parameter that is conveyed to the HLR of an SMS-capable MS when the MS is registered in a new serving system. In addition, IS-41 provides an SMSRequest (SMSREQ) invoke message that can be used to request the current location of the MS-based SME.

FIG. 2 illustrates an exemplary set of processing functions that may be employed to register an MS-based SME (residing on MS-A) and to then terminate an SMS message to the SME. As shown in FIG. 2, when an SMS-capable MS is detected by a serving system, at step 1, the serving system sends a RegistrationNotification (REGNOT) invoke message to the MS's HLR. If the serving system is SMS-capable, the message includes the SMS_Address parameter, which can be used to route short messages to the serving system for delivery to the MS-based SME. For instance, if the short message transport network is SS7-based, the SMS_Address parameter may contain an SS7 point code and subsystem number. (Alternatively, as another example, if the transport network is IP (internet protocol)-based, the SMS_Address parameter may contain an IP address.) When the serving system receives an SMDPP message addressed to this point code and subsystem number, it assumes the message is intended for a visiting MS-based SME that is specifically identified by address parameters in the SMDPP message.

In turn, when an SMSC seeks to send an SMS message to an MS-based SME, at step 2, it sends an SMSREQ message to the MS's HLR. If the HLR has a valid SMS_Address for the SME, then, at step 3, the HLR returns the SMS_Address parameter in an SMSRequest return result (smsreq) message. At step 4, the SMSC then uses the SMS_Address to route the SMDPP message to the system currently serving the SME, and the serving system in turn sends the message to the SME identified in the SMDPP message, using an SMD-REQ message.

In some instances, an SME may be unavailable to receive SMS messages. This might occur, for instance, (i) if the SME (e.g., an MS-based SME) is not registered with an HLR, (ii) if the SME is registered on an SMS-incapable system, (iii) if the SME is for some reason not authorized for SMS service on the current serving system, or (iv) if the host MS is out of radio contact or intentionally inaccessible. When an SME is unavailable and the SME's HLR receives a request for the SME's SMS_Address with an SMSRequest message for instance, the HLR may indicate the unavailability to the querying SMSC, by returning an SMS_AccessDeniedReason parameter (e.g., denied, postponed or unavailable).

In an SMSRequest message, in addition to providing the destination MS's MIN (and possibly its ESN), an SMSC can provide an SMS_NotificationIndicator parameter, which advises the HLR whether or not to notify the SMSC when the MS becomes available, in case the MS is currently unavailable. When an SMSC sends an SMSRequest message for an MS-based SME to the MS's HLR and the MS is unavailable, the HLR may then store an indication that the SMSC has a message waiting for the MS, unless the SMS_NotificationIndicator parameter indicates that the HLR need not notify the SMSC when the MS becomes available. When the MS then becomes available, the HLR may send an SMSNotification message to the SMSC, providing the SMS_Address of the MS-based SME, and advising the SMSC that it may send the stored message to the SME.

As suggested above, SMS service can involve communication over various transport networks, such as conventional SS7 networks, IP networks (e.g., the Internet), and X.25 networks, for instance. In this regard, for example, an MSC or SMSC may be programmed as, or coupled with, an "interworking function," to convert SMS messages from an SS7-encapsulated form into a form appropriate for IP-transport. This may involve converting an SMS message into a stream of TCP/IP packets for transmission over the IP transport network. This arrangement may allow network access to external IP applications (i.e., SMEs) as well as inexpensive IP access between SMSCs belonging to different networks.

For instance, an SMS message generated in an SS7-based network can be conveyed over an IP network to a POP3 e-mail server, which can then convert the message into an Simple Mail Transfer Protocol ("SMTP") e-mail message and forward the e-mail message to a designated e-mail recipient (which may be considered a type of SME). As another example, text messages generated and conveyed in an IP network (e.g., by an e-mail client) might be conveyed via the interworking function to an SME in an SS7 network. An Internet Service Provider (ISP) may thus allow an Internet e-mail subscriber to send a text message to a designated MS-based SME referenced by a given directory number, for instance. As still another example, an SMSC or MSC in one carrier's network might convey an SMS message, via an interworking function and an IP transport network, to an SMSC or MSC in another carrier's network, and the other SMSC or MSC may then deliver the SMS message to a designated recipient.

SUMMARY OF THE INVENTION

The present invention stems initially from a realization that SMS messaging is generally external to call processing and other such network activity. For instance, when an originating SME (e.g., an MS or an e-mail client) sends an SMS message to a particular destination SME, the sender does not know whether the recipient is available. Similarly, when a originating MS initiates a voice or data call, the MS's home SMSC system does not know that the call is being placed.

In accordance with a principal aspect of the present invention, these two distinct systems can be advantageously combined together, putting SMS functionality in the line of call processing. In particular, according to an exemplary embodiment, a network entity that is involved with processing calls can be arranged to recognize a call-processing event and then responsively invoke service logic to generate and send an SMS message to a particular destination.

As presently contemplated, the SMS message can describe some aspect of the call-processing event. For instance, assume that John Employee works for Paul Employer, and John Employee places a voice call to his friend Mary Smith on his landline telephone at work. An entity that is involved with processing that call can responsively generate and send an SMS message to Paul Employer's mobile telephone, indicating that "John Employee just called Mary Smith from his work phone." The entity might do so, for instance, by retrieving a canned message that reads "_ just called _", converting John and Mary's telephone numbers into name-strings (e.g., by reference to an external database), and then filling in the blanks in the canned message. Alternatively, the SMS message can convey some other sorts of information, such as an advertisement, a reminder, a warning, or the like.

In accordance with another aspect, the call-processing entity can take various forms. For instance, it could be a central control point that normally serves to provide call-processing guidance to a serving system. Or it could be a serving system, such as a switch, that normally serves to connect calls for a subscriber. Still alternatively, it could be a service node or intelligent peripheral that normally serves as a platform to provide enhanced subscriber services for a switch or other such entity. Other examples exist as well.

Further, in accordance with alternative embodiments, the invention can involve automatically sending other types of informational messages in response to various types of network activity. For example, in response to a particular network event such as call origination or termination, for instance, a call-processing entity may invoke logic to cause an audio or video server to send a real-time media stream to a mobile station directory number, or to a designated Internet address or other destination. As another example, in response to the transmission of an SMS message (i.e., a type of network activity), a network entity may generate a fax transmission (e.g., via the well known ITU-T T.38 fax over IP protocol) that includes text indicating that the SMS message was just transmitted. The network entity may then transmit the informational fax message to a predefined destination.

As yet another example, as a parental control mechanism, when a person tunes a television to a particular station, a video server can responsively send an SMS message to a designated SME indicating what station is being watched. For instance, a host device such as a cable-TV or satellite receiver serving a television, can detect when a person tunes to a given station and can responsively send an SMS message to a parent or other destination, indicating what station is being watched.

These and other features and advantages of the present invention will become apparent to those of ordinary skill in the art by reading the following detailed description with reference where appropriate to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
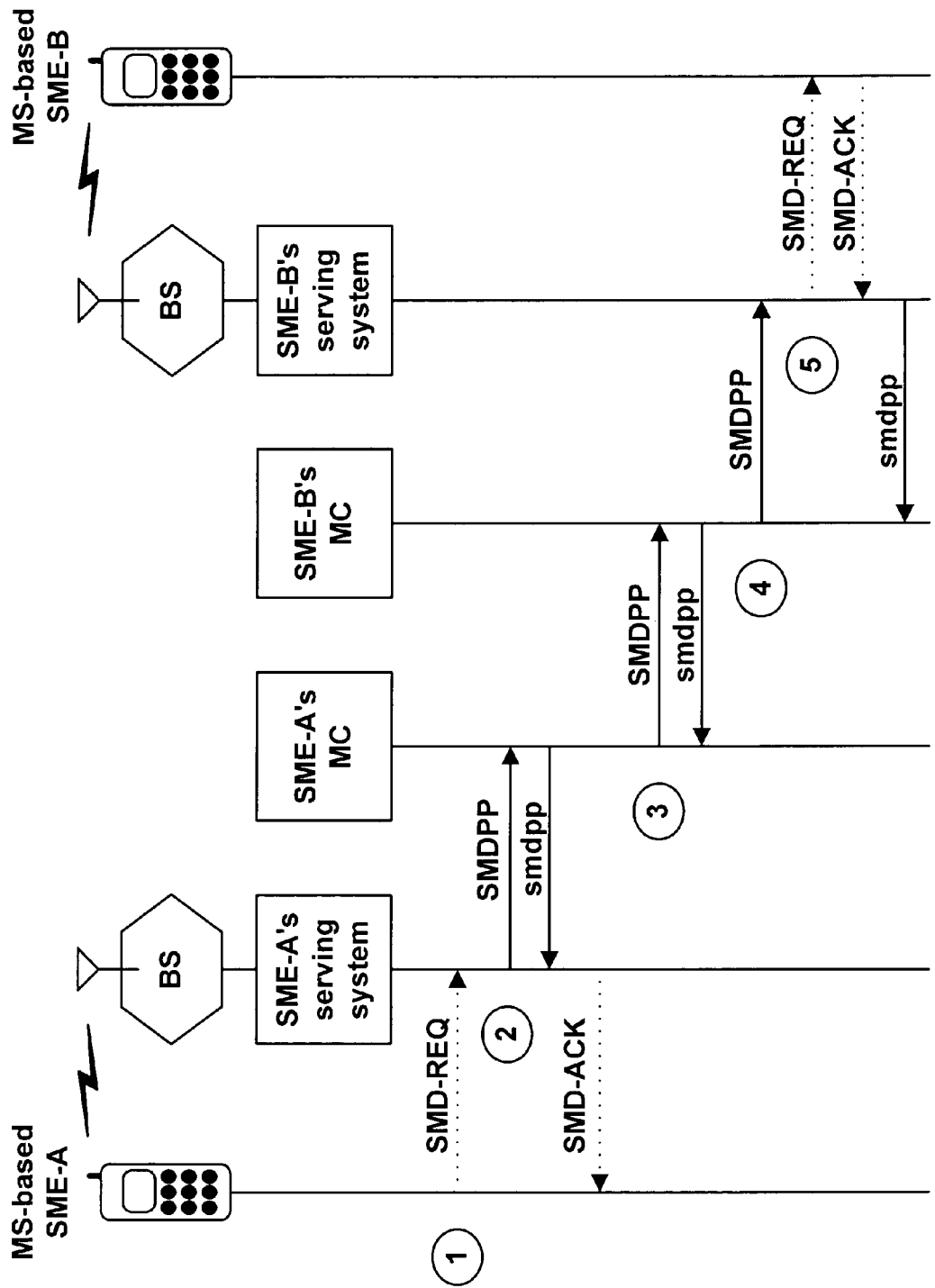
FIG. 1 is a process flow diagram illustrating communication of a short message from a first MS to a second MS.
Figure 2:
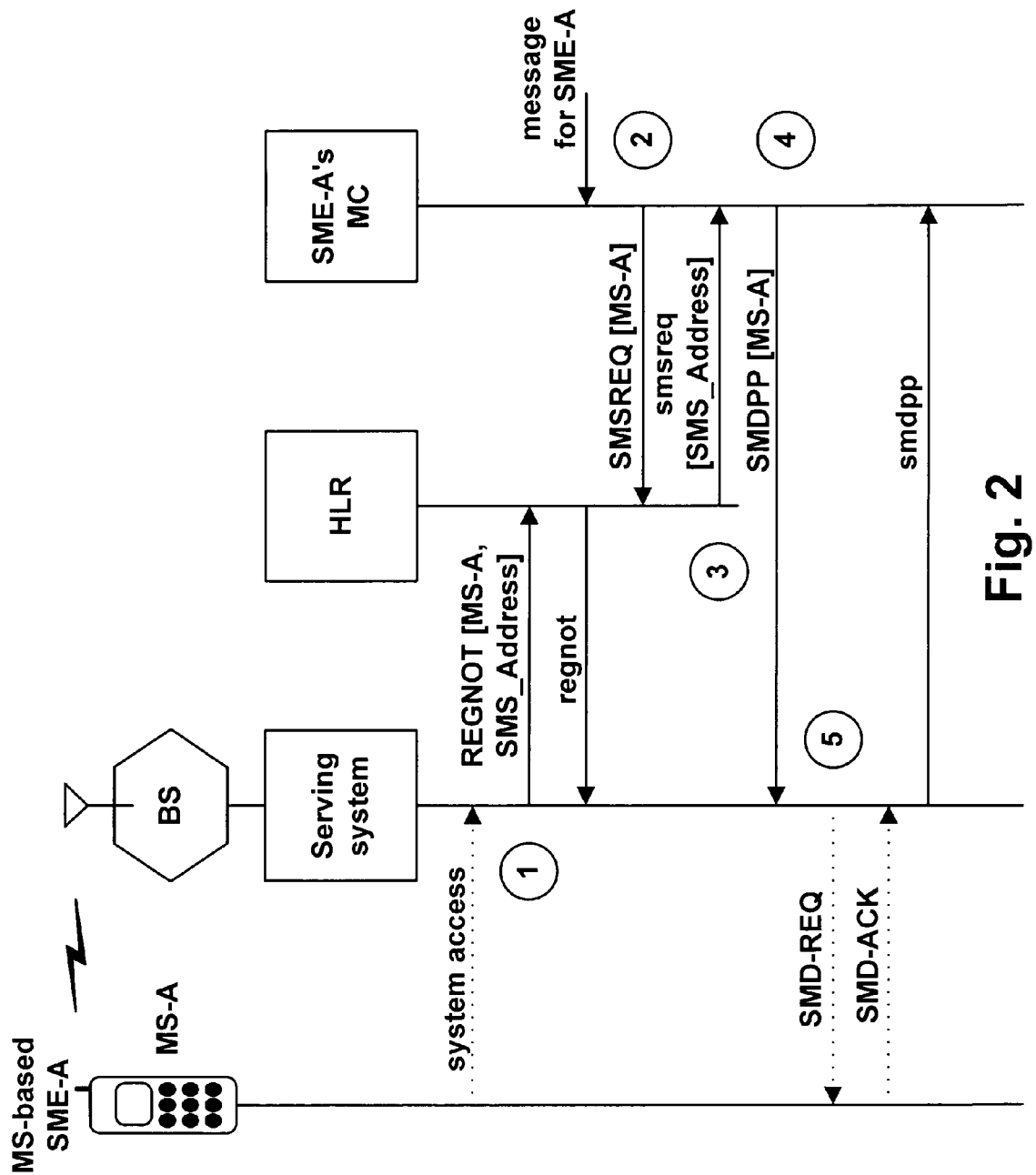
FIG. 2 is a process flow diagram illustrating registration of an MS-based SME and termination of a short message to the SME.
Figure 3:
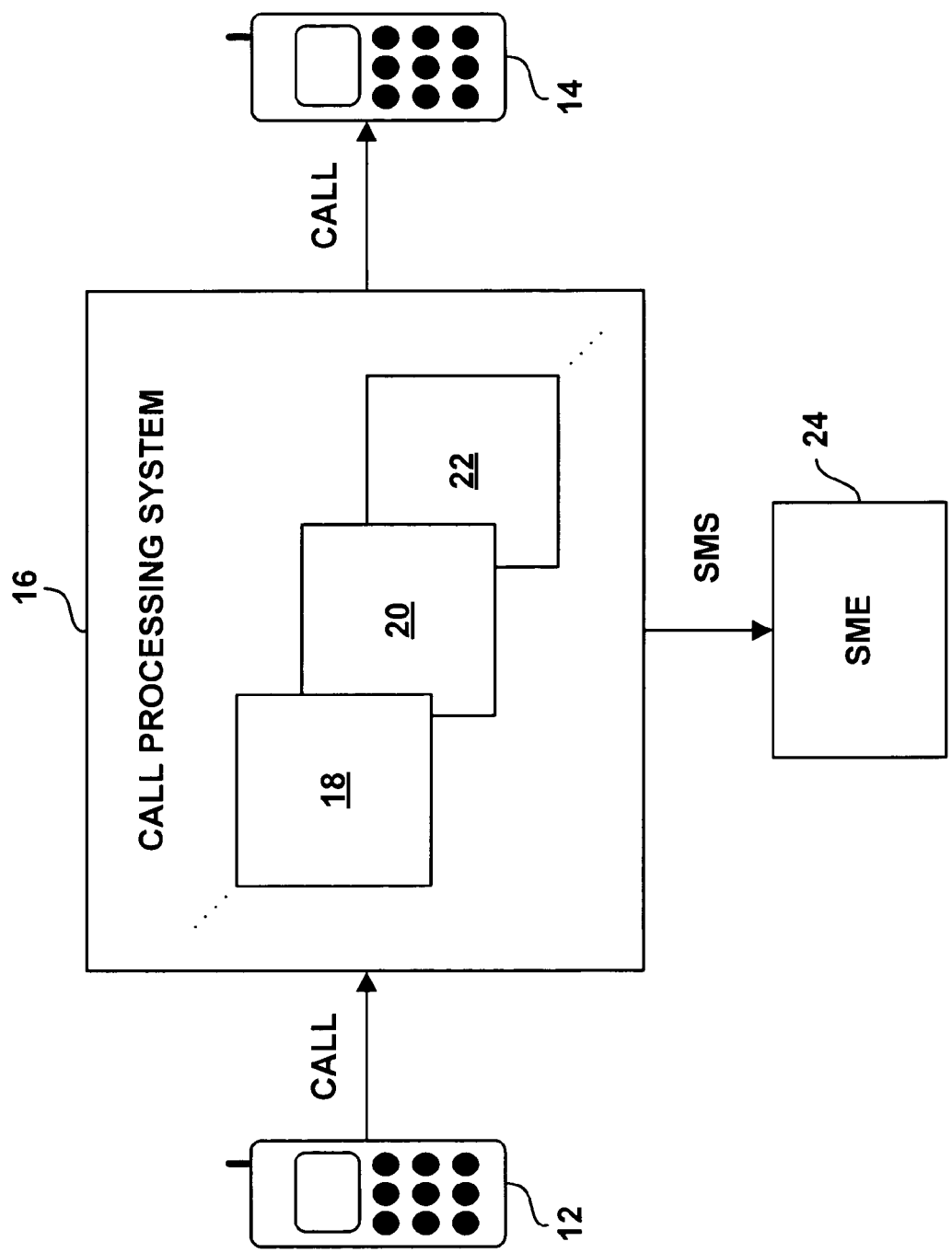
FIG. 3 is a block diagram illustrating a call processing system sending an SMS message in response to a call-processing event, in accordance with an embodiment of the invention.

Referring to the drawings, FIG. 3 illustrates a simplified block diagram of an exemplary embodiment of the present invention. As shown in FIG. 3, a first subscriber station 12 is places a call to a second subscriber station 14. The subscribers are shown as mobile stations but either or both could just as well be other types of terminals, such as landline telephones, LAN-connected computers, or fax machines, for instance. A call processing system 16 receives the origination request from subscriber 12, possibly employs supplemental logic (e.g., IN services) to the call, and connects the call to subscriber 14. Call processing system 16 might include any number of components, shown for purposes of illustration as components 18, 20 and 22. For example, one such component might be a switch, one might be a central control point, and one might be a service node.

In accordance with the exemplary embodiment, a component (or several components cooperatively) of call processing system 16, which may be referred to as a call-processing entity ("CPE"), recognizes a call-processing event. The event might be that subscriber 12 originated a call, or that subscriber 12 originated a call to subscriber 14, or that subscriber 14 received a call, or that call processing system 16 has handled more than a threshold number of calls within a certain time period, or another occurrence. In response, the CPE invokes a set of service logic to generate an SMS message and to send the SMS message to a destination SME. The SMS message can indicate that subscriber 12 placed a call to subscriber 14 or can convey other desired information.

The CPE can take any suitable form and location. For example, the CPE can be a serving system entity that normally connects/routes calls for subscribers. Examples of such entities include a landline SSP, and a wireless network MSC, as well as a gateway, router or gatekeeper in a packet-switched network, for instance. As another example, the CPE can be a central control point, such as an SCP, an HLR, or the like. As still another example, the CPE can be a service node or intelligent peripheral that normally provides enhanced service logic to assist a serving system and/or central control point in call processing. Other examples are possible as well.

The destination SME can also take any suitable form and location. For instance, the SME can reside on a mobile station, such as station 12 or 14 (even though illustrated separately) or another mobile station. As another example, the SME can reside on a pager. As still other example, the SME can reside on an ISDN landline telephone or ADSI "Smart Phone" with a text display or other interface for presenting messages. As yet another example, the SME can reside on a Internet-connected computer terminal. As a further example, the destination SME can reside on a subscriber station or other entity without text-display capabilities, provided that an intermediate mechanism is provided to convert the SMS text message into to speech for receipt at the entity.

The call-processing event may occur in one network domain, and the destination SME can be in another domain. For instance, the call-processing event may be a call placed from a mobile station in a circuit-switched network, and the destination SME may reside on a computer terminal coupled to a packet-switched network, or vice versa. As another example, the call-processing event may be a threshold level of congestion in the Internet, and the destination SME may reside on a mobile station operating in a conventional circuit-switched domain. As still another example, the call-processing event may occur in one carrier's network domain, and the destination SME may be in another carrier's network domain. (For instance, the event may be a call placed to a landline subscriber served by carrier A, and the destination SME may be wireless subscriber served by carrier B). Again, other examples are possible as well.

Alternatively, the call-processing event may occur on the same network domain in which the destination SME is located. For instance, the call-processing event may be a call placed from a mobile station in a given wireless network, and the destination SME may reside on another mobile station in that same wireless network.

In the exemplary embodiment, the CPE is programmed with a set of logic to comply substantially with the IS-41 and IS-771 industry standards for conveying SMS messages. In this regard, the CPE may be arranged to act as an SMSC that can send an SMS message to the destination SME, or the CPE may be arranged to interact with an SMSC or other such entity so as to send an SMS message to the SMSC or other entity and to have the message stored and/or forwarded in turn to the destination SME. Alternatively, the CPE can be arranged to interact with another network entity to invoke logic on the other entity so as to send an SMS message and/or to obtain information or instructions from the other entity regarding how or where to send the SMS message. By way of example and without desire to restrict the scope of the invention, FIGS. 4–7 illustrate some of many possible scenarios.

Figure 4:
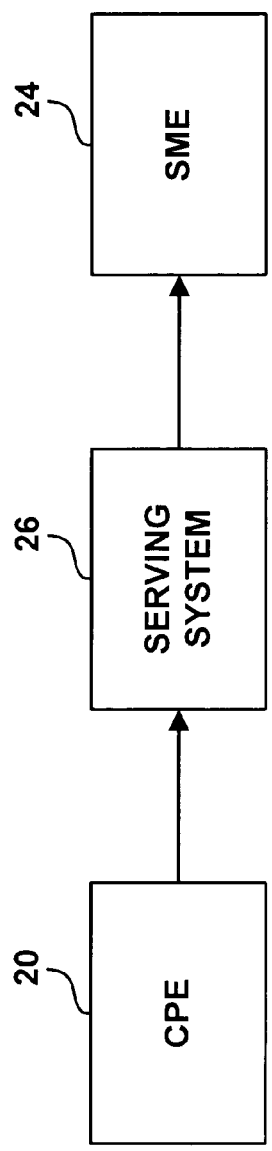
FIGS. 4–7 are a block diagrams illustrating message flows in accordance with an embodiment of the invention.

Referring first to FIG. 4, CPE 20 may itself act as an SMSC. According to IS-41, CPE 20 may be programmed with logic to obtain the SMS_Address of the destination SME 24 from the SME's HLR (not shown), in the event CPE 20 does not have the address information already. In particular, CPE may be programmed to send an IS-41 SMSREQ message to the HLR of SME 24 (possibly via one or more other HLRs), and to receive a response smsreq message from the HLR, providing the SMS_Address of SME 24 (assuming the destination SME is available). The SMS_Address may comprise the SS7 point code of a serving system 26 that serves the SME 24, for instance. Serving system 26 may, for example, comprise a switch such as an SSP or MSC, or a gateway, router or other such device on a circuit-switched or packet-switched network. As presently contemplated, when CPE 20 queries HLR for the SMS_Address, it sets the SMS_NotificationIndicator parameter to 2, to prevent the HLR from thinking that CPE 20 is the SME's new home SMSC (i.e., to prevent the HLR from changing its SMSC Index for the SME).

In turn, CPE 20 may be programmed with logic to send an SMDPP message to serving system 26, carrying the SMS destination address of SME 24 and carrying as bearer data a desired informational text message. Further, CPE 20 may be arranged to receive a response smdpp message acknowledging the serving system's receipt of the SMS message. Finally, serving system 26 may forward the SMS message to SME 24.

Figure 5:
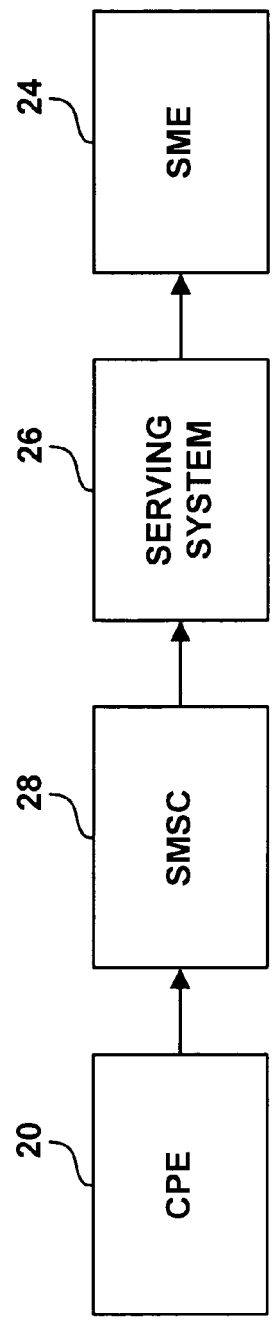

Referring next to FIG. 5, CPE 20 may alternatively (or additionally) interact with an SMSC 28 in order to cause an SMS message to be sent to SME 24. In an exemplary embodiment, CPE 20 may reference an internal or external table to identify the home SMSC 28 of SME 24 and may then send to that SMSC 28 an SMDPP message carrying a desired informational text message. In turn, SMSC 28 may interact with SME 24's HLR to get SME 24's SMS_Address and then send an SMDPP to SME 24's serving system 26 as identified by the SMS_Address. Serving system 26 may then forward the SMS message to SME 24.

Figure 6:
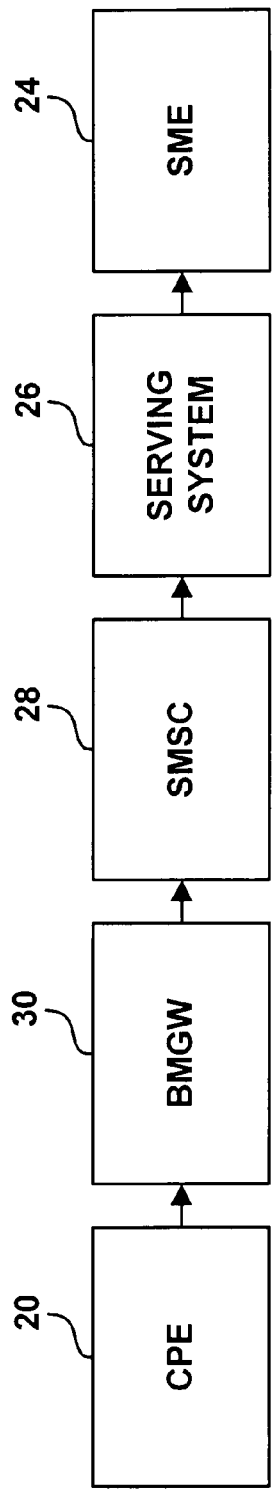

Referring next to FIG. 6, particularly in the event CPE 20 does not know the identity of SME 24's SMSC (or if otherwise desired), CPE 20 may send an SMDPP message to a bulk message gateway ("BMGW") 30. The BMGW can maintain one or more tables correlating SMSC point codes with directory numbers or other SME address identifiers. Thus, upon receipt of the SMDPP message from CPE 20, for instance, BMGW 30 can identify SMSC 28, and forward the SMDPP to SMSC 28. In turn, as above, SMSC 28 can forward the SMDPP to serving system 26, and serving system 26 can then forward the SMS message to SME 24.

Figure 7:
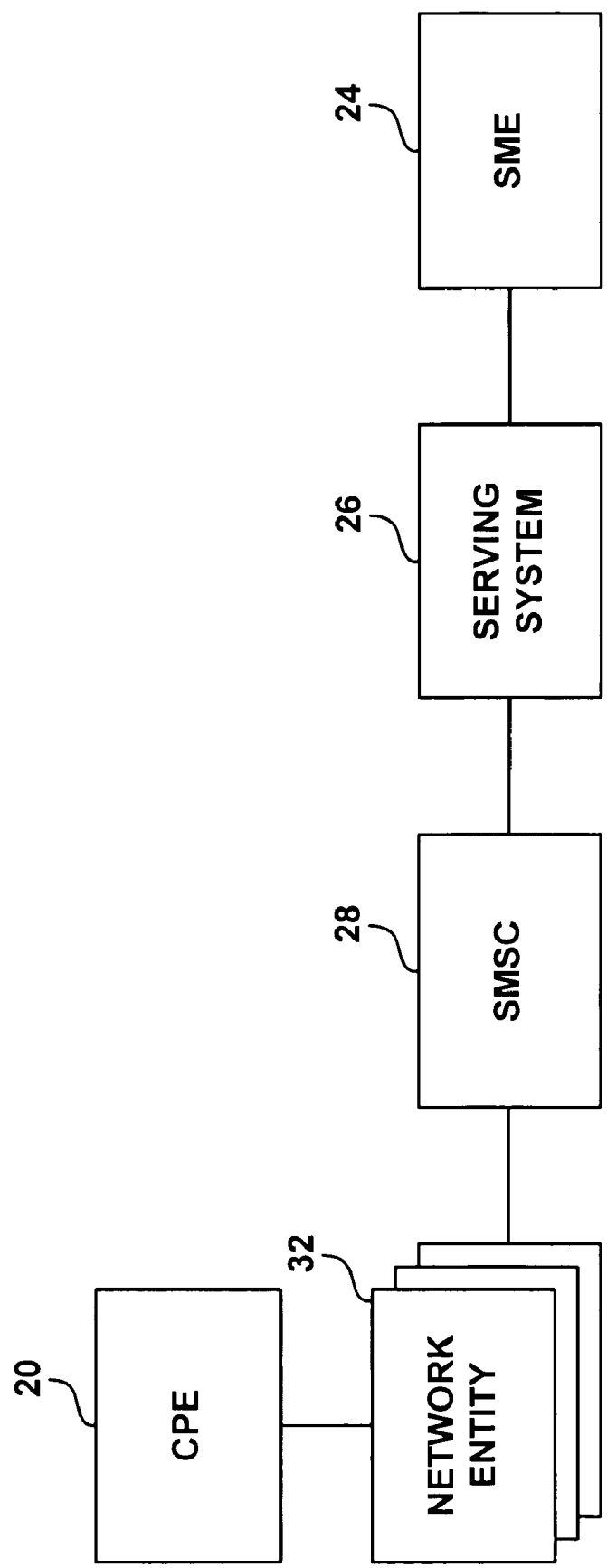

Referring next to FIG. 7, CPE 20 might interact with one or more other network entities 32 in order to send an SMS message to SME 24. Such other entities might comprise another central control point, service node, intelligent peripheral, or the like, which may be programmed with the logic necessary to generate and/or send an SMS message. Thus, for instance, in FIG. 7, CPE 20 might send a signaling message to a network entity 32, providing text to convey as an SMS message to SME 24. CPE 20 might convey the signaling message as a type of SS7 message (e.g., a TCAP message, or an ISDN User Part ("ISUP") message, or a Generic Data Interface ("GDI") message over IP, or via any other desired protocol and transport system for instance). Network entity 32 may then generate and send to SMSC 28 an SMDPP message providing the text (or some modified version of the text) as bearer data. In turn, SMSC 28 may forward the SMDPP to serving system 26, and serving system 26 may send the SMS message to SME 24.

Figure 8:
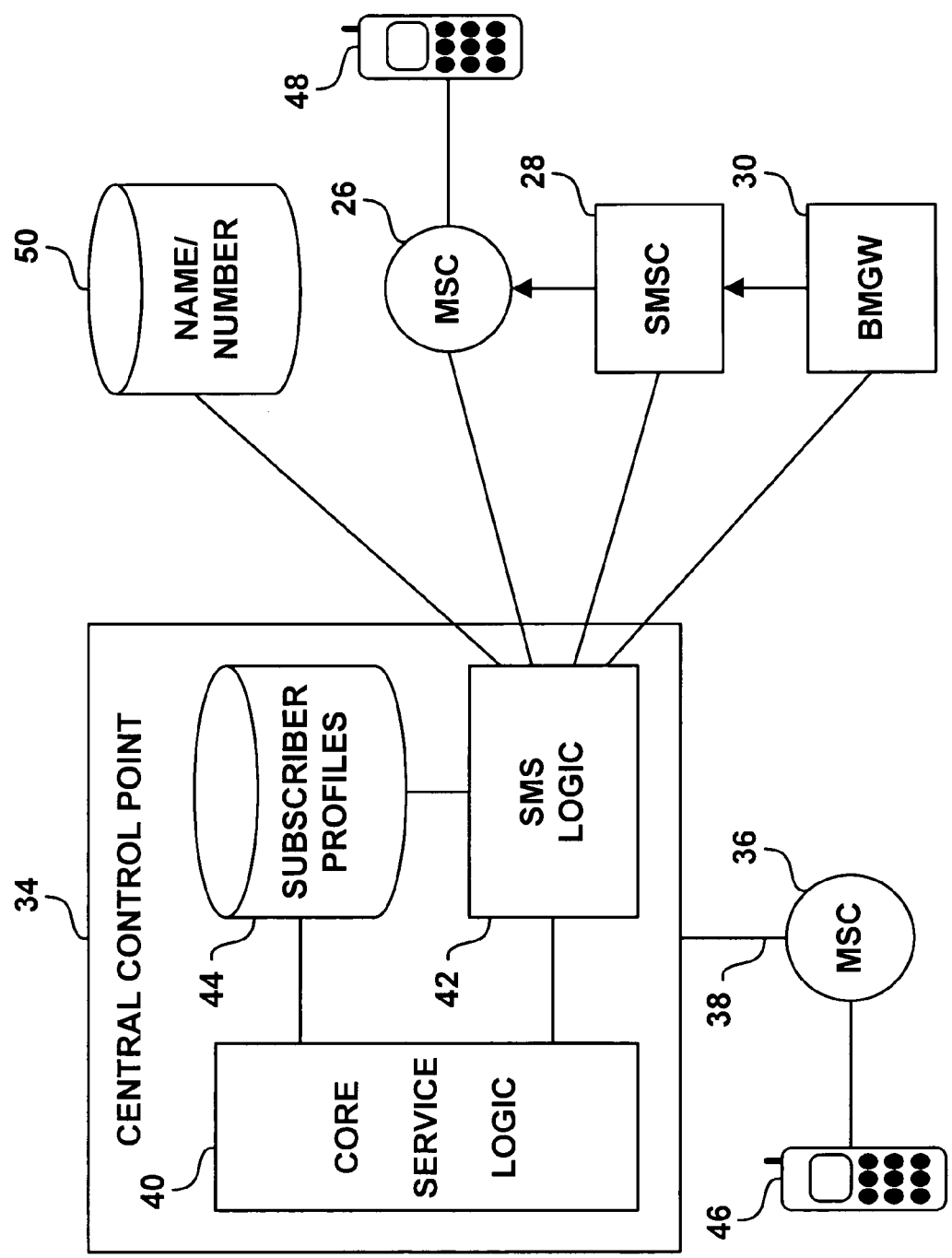
FIG. 8 is a block diagram illustrating an exemplary embodiment of the invention.
Figure 9:
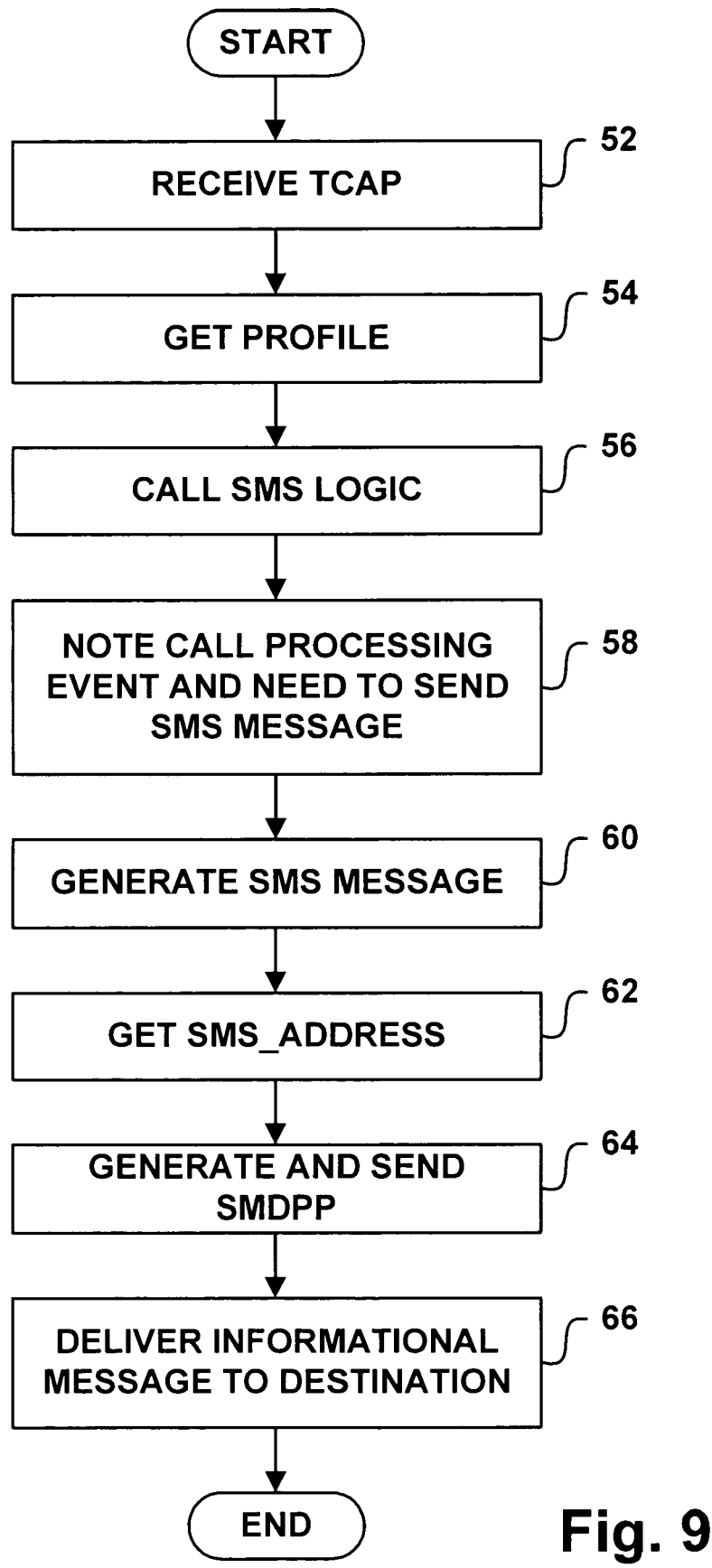
FIG. 9 is a flow chart illustrating a functional process flow in an exemplary embodiment of the invention.

As noted above, CPE 20 can be a central control point ("CCP"), such as an SCP or HLR, for instance. In an exemplary embodiment, the CCP recognizes a call-processing event and responsively invokes service logic to generate and send an SMS message to a specified destination SME. FIG. 8 further illustrates one such arrangement, and FIG. 9 presents a flow chart depicting some of the process steps that may occur in this arrangement.

As shown in FIG. 8, a CCP 34 is provided and is coupled to an MSC 36 via a CCIS network 38. In accordance with the exemplary embodiment, the CCP comprises a processor (not shown), a set of core service logic 40 executable by the processor, and a set of SMS logic 42 executable by the processor. In addition, the CCP comprises a database of subscriber profiles 44. Each subscriber profile may be keyed to a subscriber identification number (such as a directory number, MSID, ESN, or other such number) and may define, for a given subscriber or group of subscribers, what services the subscriber or group subscribes to.

As presently contemplated, one of the services defined by a subscriber profile can be automatic SMS messaging. In this regard, if the profile indicates that a subscriber subscribes to automatic messaging, the profile also preferably defines a number of data parameters (in the form of a data template, for instance) for the subscriber, which can be referenced by SMS service logic 42 to facilitate automatic messaging. By way of example, these data parameters may indicate, among other things:

1. The call-processing event or events in response to which a message should be generated. Examples of such events may include origination, origination to a specified destination, termination, termination from a specified destination, call forwarding, and so forth.
2. The message(s) to generate and/or send in response to the call-processing events. These may be text strings defining complete messages in and of themselves, for instance, or they may be partially defined messages with blanks to be filled in based on the particular call-processing event or other information.
3. The type of message to send. The type of message may be SMS text message, or may be some other type of message.
4. The destination to which the message(s) should be sent.

In addition, the subscriber profile may contain data parameters indicating where the subscriber is currently located, such as on what network or in what user zone.

As further illustrated in FIG. 8, CCP may include or be coupled by a CCIS network (or other communication path) to a name/number database 50. This database may contain one or more tables that correlate subscriber names and numbers. An example of such a database is a Local Information Database (LIDB), but other examples exist as well. In the context of the exemplary embodiment, database 50 can be used to translate a calling or called number into a name, so that the CCP can generate a text message that indicates the name of the calling or called party.

In operation, when CCP 34 receives a TCAP message, its core service logic 40 will parse the message to identify the subscriber and will query the subscriber profile database 44 to determine what services the subscriber subscribes. If one of these services is automatic messaging, the core logic will then call the SMS logic 42 as a type of subroutine call. The SMS logic may then refer to the automatic messaging parameters in the subscriber profile and, based on these parameters, carry out the automatic messaging function.

As an example, assume that George Smith subscribes to wireless telecommunications service for his mobile station 46 and that his subscriber profile indicates he subscribes to automatic-messaging service. Assume further that his profile indicates that, in response to any call that he originates to a number in area code 314, an SMS message stating "George Smith called [called party name] at [time] on [date]" should be generated and sent to a specified MS-based SME 48 that is registered to another person, say Pete Harrison.

When Mr. Smith dials a number in area code 314 on MS 46 and presses SEND, an origination request will be conveyed via an air interface (not shown) and base station controller (not shown) to a serving system comprising MSC 36. Upon receipt of the origination request, MSC 36 references a subscriber profile for MS 46 and encounters an all-digits trigger that points to CCP 34. In response, MSC 36 then generates and sends a TCAP message via CCIS 38 to CCP 34, carrying as parameters the MSID of MS 46, and the dialed digits.

Referring now to FIG. 9, at step 52, when CCP 34 receives the TCAP message, its core service logic 40 responsively parses the message and stores the parameters of the message in memory. At step 54, core logic 40 then queries subscriber profile database 44 to obtain the subscriber profile for MS 46, by reference to its MSID for example. Based on this profile, at step 56, core logic 40 calls SMS logic 42. At step 58, SMS logic 42 then references the subscriber profile and stored TCAP parameters, and SMS logic 42 determines that, since the dialed digits represent an 314 code number, CCP 34 should generate the specified message to be sent to MS-based SME 48.

At step 60, SMS logic 42 generates the specified text message. In doing so, SMS logic 42 retrieves the partially canned message from Mr. Smith's profile and notes that the message is supposed to include the name of the called party and the date and time of the call. Given only the number of the called party, SMS logic 42 concludes that it must convert the dialed digits into the name of the called party. Thus, SMS logic 42 queries name/number database 50, to identify the subscriber name corresponding to the dialed subscriber number, and the database returns a string value, "Pete Harrison". In addition, SMS logic 42 identifies the current time as 14:34:03 and the current date as Jul. 29, 2004. SMS logic 42 then inserts these parameters into the partially defined message and establishes a complete informational text message, which reads, "George Smith called Pete Harrison at 14:34:03 on Jul. 29, 2004.

At step 62, SMS logic 42 (or another module of CPE 34) then sends an SMD-REQ message to the HLR of MS 48 and obtains in response an SMS_Address identifying the point code of the MSC 26 that is currently serving MS 48. At step 64, SMS logic 42 then generates an SMDPP message carrying the derived informational text message as bearer data and sends the message to MSC 26. Finally, at step 66, upon receipt of the SMDPP, MSC 26 then delivers the SMS message to MS 48, where the text message is displayed for viewing by Pete Harrison. Alternatively, as noted above, SMS logic 42 might send an SMDPP message to BMGW 30 or to SMSC 28, to be forwarded in turn to MSC 26.

Note that, in this example, the message describes the call-processing event that triggered the message to be sent. However, the message could equally take other forms and convey other information. For instance, the message could be a reminder that Mr. Smith has an appointment or could be some other indication unrelated to the call-processing event.

It should be understood that CPE 20 may instead be another type of entity or combination of entities. For instance, as noted above, CPE 20 could be a service node, which normally serves to provide enhanced service logic to assist a switch. (For instance, a service node might include an intelligent voice response unit, DTMF tone recognition capability, and other facilities to interact with subscribers.) A service node can have effectively the same sort of configuration as shown in FIG. 8 for CCP 34. While the service node might not usually receive a TCAP message, it might receive other signaling messages from the switch, which could indicate the occurrence of a call-processing event. Similarly, the CPE could be an intelligent peripheral.

As another example, CPE 20 could be a switch or other entity in a serving system. For instance, a subscriber profile maintained by a switch could indicate that when the subscriber originates or receives a specified number of calls, a SMS message should be sent to a particular destination, and the profile might define the message and destination. Like the exemplary CPEs described above, the switch can then itself employ logic to generate and send the SMS message and/or invoke an external application to do so.

In general, the informational message that is generated and sent as an SMS message according to the exemplary embodiment is meant to convey information to a human, such as through visual or audible display. Therefore, the message is generally distinguishable from signaling messages, such as TCAP messages, GDI commands, and so forth, that are meant to convey information to machines.

In this light, the invention can also extend to generating and sending informational messages other than SMS messages. As noted above, for instance, the informational message generated and sent in accordance with the invention could be an e-mail message, complying with the well known SMTP protocol. In that case, for example, the CPE could recognize a call-processing event and responsively generate and send an SMTP text message to a POP3 server, to be forwarded in turn to a designated e-mail address. As another example, the informational message could be a real-time media message such as a video message or audio message. For instance, the CPE could recognize a call-processing event and responsively signal to a video server to send a video stream to a designated video-capable station. As still another example, the informational message could be a fax message, in which case, for instance, the CPE could send a text/graphics information to a fax server, and the fax server can then encode and send the information as a fax transmission to a designated fax recipient.

In addition, although the exemplary embodiment involves automatically generating and sending an informational message in response to a specified call-processing event, the invention may also extend to automatically generating and sending informational messages in response to other types of triggering events. For example, an e-mail client or server may be configured to generate and send an SMS message in response to particular e-mail messages, such as e-mail message from a particular party.

As another example, a CTI (computer telephony interface) or other entity may include an alias e-mail server that is arranged to screen e-mails and, in response to an e-mail to or from a particular party, to send a message to an SCP, telling the SCP that e-mail has arrived. This message may, for instance, be a TCAP message. In response, SMS logic on the SCP may generate and deliver message to indicating that the e-mail arrived.

Figure 11:
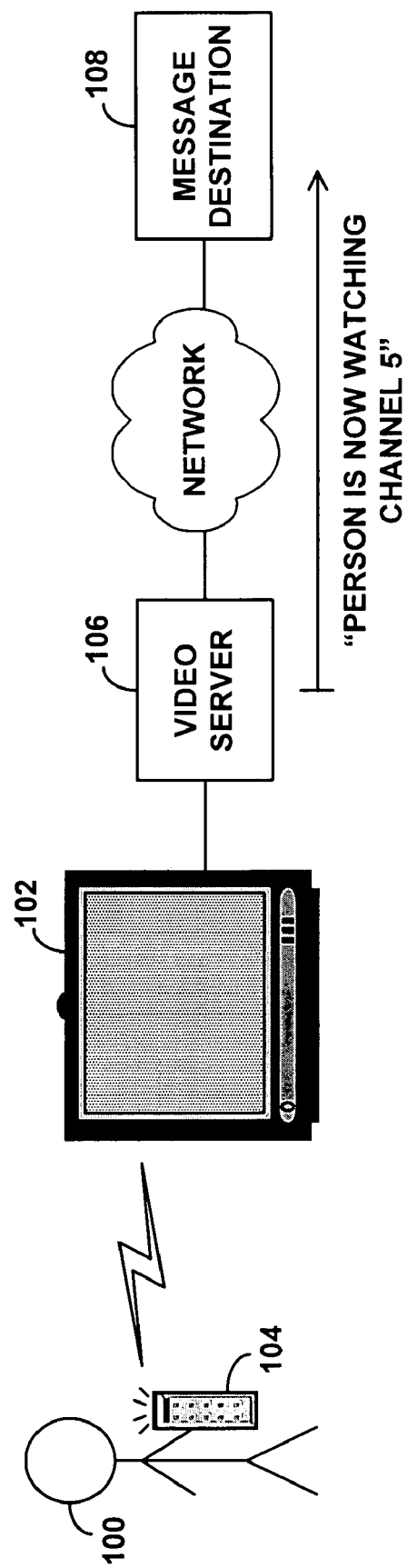
FIG. 11 is a block diagram illustrating an arrangement in which a video server sends an informational message indicating a station to which a user has tuned a television.
Figure 12:
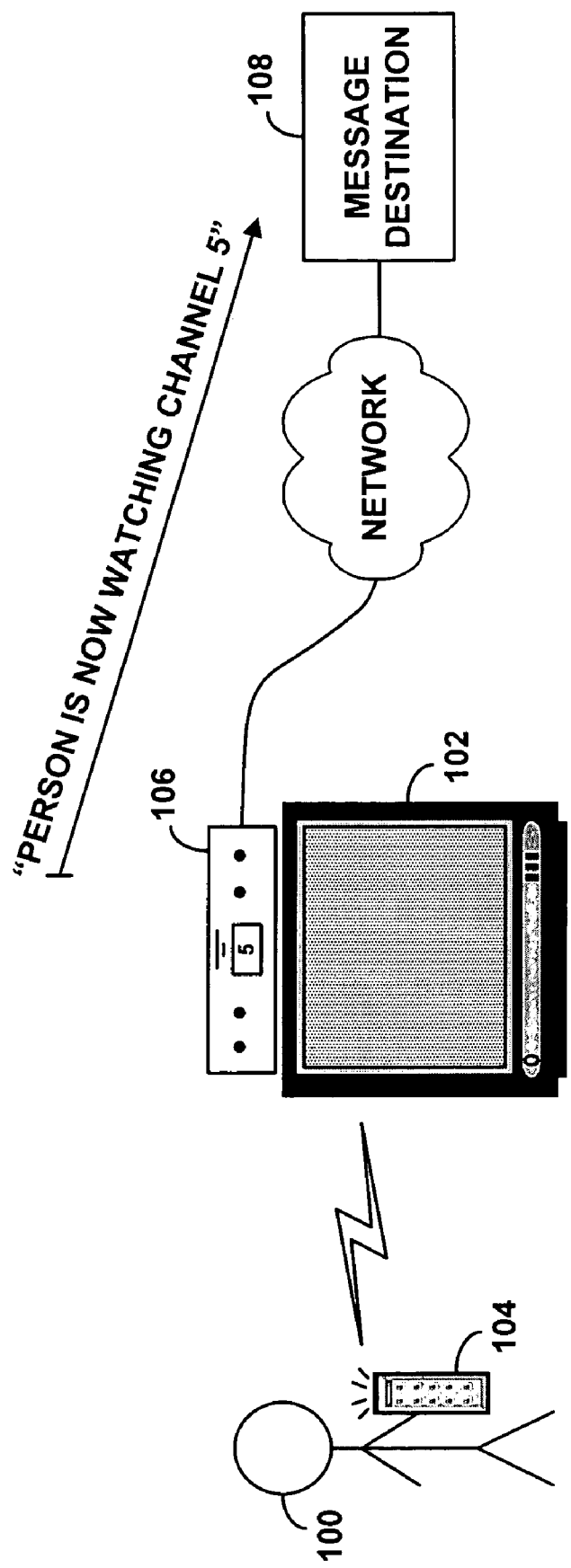
FIG. 12 is a block diagram illustrating an arrangement in which a host device, such as a cable-TV receiver or satellite-TV receiver sends an informational message indicating a station to which a user has tuned a television.
Figure 13:
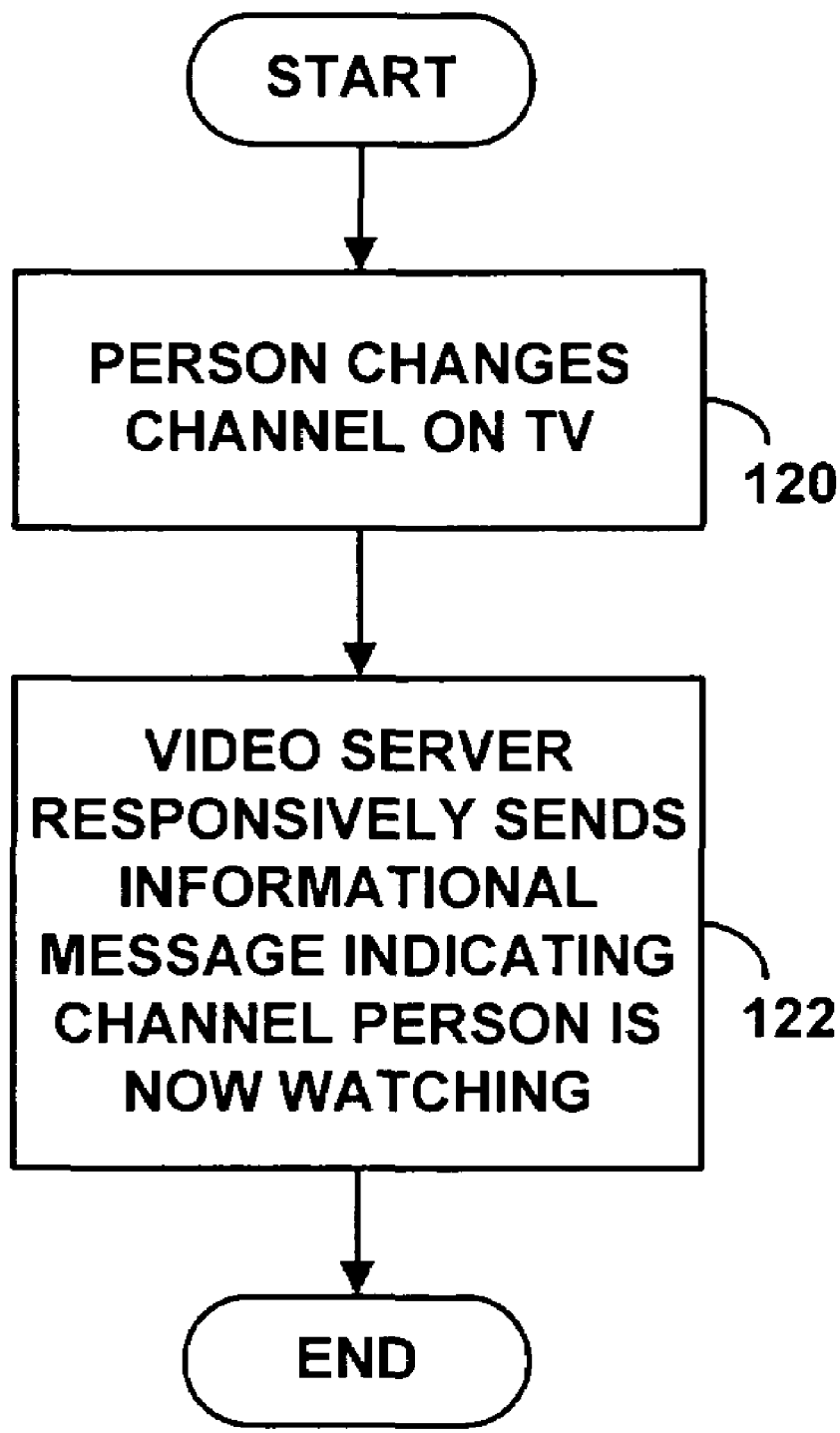
FIG. 13 is a flow chart illustrating a process of sending an informational message when a user changes a television channel.

As still another example, as a parental control mechanism, when a person tunes a television to a particular station, a video server can responsively send an SMS message to a designated SME indicating what station is being watched. FIGS. 11–13 illustrate this scenario.

Referring to FIG. 11, for instance, a person 100 may be watching a television 102 and may operate a remote control 104 or other mechanism well known in the art to change the channel (a/k/a station) on the television. A video server 106 serving the television may then responsively send an SMS message or other informational message to a designated destination 108, indicating the channel to which the television is tuned, i.e., the channel that the person is watching. For instance, if the person changes the television to channel 5, the video server might send a message such as "Person is now watching channel 5."

FIG. 12 next depicts a more specific example of this scenario. In FIG. 12, the video server is shown as a host device (e.g., a cable-TV receiver or satellite TV receiver, external to and/or integrated into the television 102), which serves television signals to the television 102. In this arrangement, a user can conventionally change the television channel by using a remote control 104 or other mechanism to switch the host device to a desired channel. The host device would then feed that channel to the television 102. (Note that the video server could take other forms and could reside in other locations as well. For example, it could be located remotely from the television, in a network.)

In accordance with the exemplary embodiment, when the user changes the channel on the television 102 by switching the host device to a desired channel, the host device could apply program logic to responsively send to a predefined destination an SMS message or other informational message that indicates the television channel that the person is watching. The host device could send the informational message wirelessly (e.g., using an integrated cellular chipset) or over a landline connection (e.g., as an IP-based message through a broadband connection), depending on its configuration.

FIG. 13 is a flow chart further illustrating this alternative function. As shown in FIG. 13, at block 120, a person changes the channel on the person's television. At block 122, a video server then responsively sends an SMS message or other informational message that indicates the channel the person is currently watching. In an exemplary embodiment, the person watching the television could be a child, and the video server could send the informational message to the child's parent, so as to alert the parent that the child is watching the given channel.

Further, while the exemplary embodiment contemplates generating and sending one informational message in response to a given triggering event, the invention can also extend to generating more than one message in response to a given triggering event. In addition, the invention can extend to sending one or more informational messages to a plurality of message recipients (e.g., SMEs). In that event, the entity sending the message could multicast the message itself or invoke a multicasting application on another entity to distribute the informational messages to a multiple recipients.

Still further, as mentioned above, the present invention is not necessarily restricted to sending an informational message to an entity in the same network domain as that in which the underlying call-processing (or other) event occurs or is detected. For instance, a triggering event might be associated with mobile station, and, in response to that triggering event, an informational message may be sent to a landline station. As another example, a triggering event might be associated with a landline station, and, in response to that event, an informational message may be sent to a mobile station. As still another example, a triggering event might be associated with a terminal on a packet switched network, and, in response to the triggering event, an informational message may be sent to a fax machine on the circuit-switched PSTN.

Figure 10:
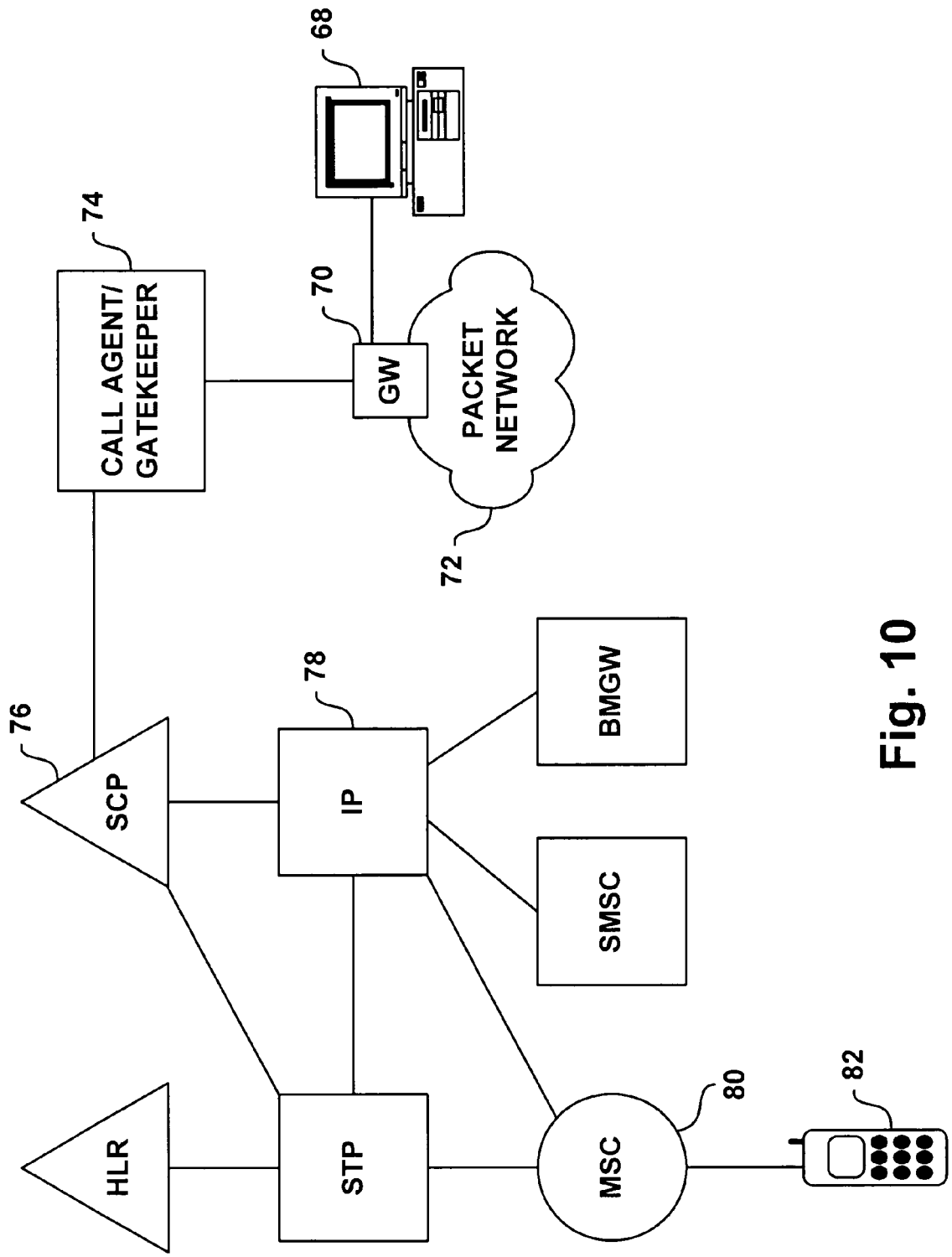
FIG. 10 is a block diagram illustrating another network arrangement in which an embodiment of the invention may be implemented.

As yet another example, the triggering event may be associated with a terminal on a packet switched network, and, in response to the triggering event, an informational message may be sent to a wireless station operating within a circuit-switched network. FIG. 10 illustrates this scenario by way of example. As shown in FIG. 10, a computer terminal 68 is coupled (e.g., by a point-to-point connection) with a gateway 70 that provides connectivity with a packet switched network 72 such as the Internet. Gateway 70 may in turn be coupled with (or in communication with via the packet network) a call agent or gatekeeper 74. Gatekeeper 74 is then coupled with an SCP 76, which is coupled with an intelligent peripheral ("IP") 78, which is in turn coupled with an MSC 80. MSC 80 then serves an exemplary mobile station 82.

As presently contemplated, SCP 76 can serve as a central control point for communications involving computer terminal 68 or gateway 70. For instance, when terminal 68 seeks to send a message to a designated IP address, gateway 70 might send a signaling message to gatekeeper 74, and gatekeeper 74 might in turn send a signaling message to SCP 76. The signaling message may identify terminal 68 and the destination IP address or other such parameters. SCP 76 might then refer to a subscriber profile for terminal 68, determine that the message should be re-routed to an alternate IP address, and return a message with re-routing instructions to gatekeeper and from there to gateway 70. Gateway 70 may then route the message from terminal to the alternate IP address.

In accordance with an exemplary embodiment, SCP 76 can be programmed with SMS logic for terminal 68. In a manner similar to that described above, the logic might state that, when terminal 68 originates or terminates a particular type of message, SCP should invoke service logic to send an SMS message to mobile station 82. To illustrate yet another alternative arrangement, the SMS logic programmed in SCP 76 may be arranged to send a signaling message to IP 78 (e.g., via a GDI or other suitable interface), and the IP may in turn be programmed with SMS logic to send an SMS message to MSC 80 for ultimate receipt by MS 82. In this example, SCP 76 might provide IP 78 with the informational message to be sent as an SMS message. Alternatively, IP 78 might derive the informational message itself, possibly incorporating parameters conveyed in the signaling message from SCP 76. Further, instead of employing IP 78 for these functions, SCP may communicate with another entity in the same or other network domain.

While several examples have been described above, the present invention can have wide application. Additional examples of how the invention might be used include:

In response to a feature code dialed mid-call to invoke a service feature, a CPE may automatically send an informational message indicating that the service was invoked.

When an alarm system (e.g., a burglar alarm) is activated and results in a specified telephone number being called, a CPE can detect the dialed digits from the calling party as a trigger and automatically send an informational message (e.g., SMS, e-mail, fax, etc.) to a designated location to advise of the alarm.

A CPE can be programmed to count the number of call origination attempts that occur within a specified time and, when the count reaches a predefined threshold (a type of "threshold event"), the CPE can automatically send an informational message to a specified destination. Similarly, a lack of network activity (e.g., lack of origination or termination attempts) for a certain time period can cause a CPE to automatically send an informational message to a specified destination.

If a CPE (or other entity) has a message to send to a subscriber at a landline telephone, the CPE can send a message waiting indicator (e.g., LED light, LCD display, etc.) to telephone. When the telephone is taken off hook, the switch or other entity serving the telephone may encounter an off-hook trigger and responsively query a CCP for call-handling instructions. In response to this off-hook event, the CCP may then automatically send the message to the landline telephone (as text, voice, etc.)

Exemplary embodiments of the present invention have been illustrated and described. It will be understood, however, that changes and modifications may be made to the invention as described without deviating from the spirit and scope of the invention, as defined by the following claims.

We claim:

1. A method comprising:
   when a person tunes a television to a given station, a video server responsively sending a Short Message Service (SMS) message to a designated destination, indicating what station is being watched,
   wherein sending an SMS message to a designated destination comprises sending the SMS message to a parent of the person.

2. The method of claim 1, wherein the video server comprises a host device serving the television.

3. The method of claim 2, wherein the host device comprises a cable-TV receiver.

4. The method of claim 2, wherein the host device comprises a satellite-TV receiver.

5. The method of claim 2, wherein the person tunes the television by tuning the host device.

* * * * *